(12) United States Patent
Schwendinger et al.

(10) Patent No.: US 7,264,175 B2
(45) Date of Patent: Sep. 4, 2007

(54) THERMOSTAT WITH PARAMETER ADJUSTMENT

(75) Inventors: Paul G. Schwendinger, St. Louis Park, MN (US); Jason L. Ableitner, Hopkins, MN (US); David P. Mulhouse, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 331 days.

(21) Appl. No.: 10/882,443

(22) Filed: Jul. 1, 2004

(65) Prior Publication Data

US 2006/0000919 A1    Jan. 5, 2006

(51) Int. Cl.
G05D 23/00 (2006.01)
(52) U.S. Cl. ............... 236/94; 62/129; 62/228.1; 165/11.1
(58) Field of Classification Search ............... 236/1 C, 236/1 R, 94; 62/126, 129, 228.1, 228.4, 62/229; 165/11.1
See application file for complete search history.

(56) References Cited

U.S. PATENT DOCUMENTS

| | | | |
|---|---|---|---|
| 2,729,719 A | 1/1956 | Kronmiller | |
| 4,414,520 A | 11/1983 | Ruuth | |
| 4,449,832 A | 5/1984 | Kammerer | |
| 4,456,169 A | 6/1984 | Martin | |
| 4,621,336 A | 11/1986 | Brown | |
| 4,646,964 A | 3/1987 | Parker et al. | |
| 4,669,654 A | 6/1987 | Levine et al. | |
| 4,685,614 A | 8/1987 | Levine | |
| 4,751,961 A | 6/1988 | Levine et al. | |
| 5,107,918 A | 4/1992 | McFarlane et al. | |
| 5,148,979 A | 9/1992 | Brueton | |
| 5,194,842 A | 3/1993 | Lau et al. | |
| 5,211,332 A | 5/1993 | Adams | |
| 5,303,612 A | 4/1994 | Odom et al. | |
| 5,348,078 A * | 9/1994 | Dushane et al. | 165/209 |
| 5,542,279 A | 8/1996 | Erdman et al. | |
| 5,673,850 A | 10/1997 | Uptegraph | |
| 5,847,526 A * | 12/1998 | Lasko et al. | 318/471 |

(Continued)

OTHER PUBLICATIONS

Carrier, "Thermostats: Carrier HVAC Parts," 52 pages, printed Oct. 14, 2003, http:///www.carrierhvacparts.com/Merchant2/merchant.mv.

(Continued)

*Primary Examiner*—Marc Norman

(57) ABSTRACT

A thermostat includes a number of control parameters including a temperature set point, a selected cycle rate, a room temperature swing setting, and/or any other suitable control parameter. In one illustrative embodiment, the thermostat includes a push button for providing a signal each time it is depressed and a controller coupled to the push button. The controller is adapted to receive a sequence of one or more signals from the push button, and is further adapted to set a control parameter such as the cycle rate or room swing setting to a value that corresponds to the sequence of one or more signals. In another illustrative embodiment, the thermostat includes a mechanical user interface such as a rotating selector or slider. The thermostat is adapted to receive a signal that relates to the current position of the mechanical user interface, and sets a control parameter of the thermostat based thereon. In some cases, the mechanical user interface is adapted to set a temperature set point when the thermostat is in a first mode, and a different control parameter when the thermostat is in a second mode.

42 Claims, 4 Drawing Sheets

U.S. PATENT DOCUMENTS 5,943,917 A  8/1999  Truong et al.
6,741,158 B2  5/2004  Engler et al.

OTHER PUBLICATIONS

Ritetemp, "The RiteTemp Support Site—8099 Technical Support Page," 1 page, printed Oct. 14, 2003, http:///www.ritetemp-thermostats.com/8099.html.

Ritetemp, "The RiteTemp Supprt Site—What Thermostat," 1 page, printed Oct. 14, 2003, http://www.ritetemp-thermostats.com/What_Thermostat.html.

Ritetemp, "Install Guide 8095," 7 pages, prior to filing date of present application.

Ritetemp, "Install Guide 8099," 8 pages, prior to filing date of present application.

* cited by examiner

THERMOSTAT WITH PARAMETER ADJUSTMENT

BACKGROUND

Thermostats are widely used in dwellings and other temperature-controlled spaces. In many cases, thermostats are mounted on a wall or the like to allow for the measurement and control of the temperature, humidity and/or other environmental parameter within the space. Thermostats come in a variety of shapes and with a variety of functions. Some thermostats are electromechanical in nature, and often use a bimetal coil to sense and control the temperature setting, typically by shifting the angle of a mercury bulb switch. These thermostats typically have a mechanical user interface, such as a rotating knob, a slider, or the like, to enable the user to establish a temperature set point. More advanced electronic thermostats have built in electronics, often with solid state sensors, to sense and control various environmental parameters within a space. The user interface of many electronic thermostats includes software controlled buttons and/or a display. It has been found that while electronic thermostats often provide better control, thermostats with a mechanical user interface can be more intuitive for many users. Many users, for example, would be comfortable with a rotating knob that is disposed on a thermostat for setting a desired set point or other parameter.

One factor in operation of HVAC devices such as, for example, a furnace, which is controlled at least partly by the thermostat is the cycle time or cycle rate, or the time between successive startups of the furnace. Cycle time is usually measured not in the actual time between successive startups but instead in terms of the number of startups or cycles per hour, abbreviated "cph." Thus a cycle time of 20 minutes is the equivalent of 3 cph.

It may be preferred to have a lower cycle rate, typically 3 cph, for high efficiency furnaces for a variety of reasons. Chief among these is the fact that the combustion gasses ejected from a high efficiency furnace are cooled to a level which is very near to the condensing temperature of the water vapor in the combustion gasses. This may cause moisture to condense in the chimney duct and flue during each startup of the furnace. If the cph value is high, the moisture can accumulate because the flue does not get a chance to thoroughly heat and evaporate any condensed moisture. Since these chimney ducts and flues are often at least partly include galvanized steel, accumulated moisture can eventually cause rusting and even perforation of the duct. Perforation of the duct, in particular, is a serious situation since it may allow release of toxic combustion products within living spaces. Less efficient furnaces release combustion gasses at a higher temperature which tends to thoroughly heat and dry out the chimney duct, even with a high cycle rate. It is therefore possible to run less efficient furnaces at higher cycle rates without harm to the flues and ducts. A common cycle rate for furnaces having conventional efficiencies is in the range of 5 cph. Other things being equal (which they often are not), it is preferable to run at a higher cycle rate because room temperature swing during each cycle may be kept smaller at such higher cycle rates. However, when using a higher efficiency furnace, one can often compensate for the larger room temperature swings that result from lower cycle rates by simply increasing the temperature setting slightly for the thermostat.

The present invention provides cost effective methods and apparatus for adjusting cycle rate and/or other parameters of a thermostat using a combination of mechanical and electrical components. Often, the thermostat includes a mechanical user interface, and the mechanical user interface is used to help select a desired parameter value. In some embodiments, an LCD display or the like is not required or even desired, which may help reduce the cost of the thermostat.

SUMMARY

The present invention relates generally to cost effective methods and apparatus for adjusting cycle rate and/or other parameters of a thermostat by using a combination of mechanical and electrical components. Some other illustrative parameters may include, for example, room swing, ventilation rate, type of HVAC equipment used (e.g. hydronic, high efficiency, low efficiency, forced air, electric heat, heat pump, etc.), window heat efficiency used for humidity control, humidity level, and/or any other desired parameter.

In one illustrative embodiment, a thermostat includes a mechanical user interface which, when engaged or otherwise manipulated, provides a signal to a controller. In one example, the mechanical user interface includes a push button for providing a signal each time it is depressed. The controller may be adapted to receive a sequence of two or more discrete signals from the push button, and in response, may set a desired parameter of the thermostat to a value that corresponds to the sequence of two or more signals. For example, a user may depress the push button three times in sequence, and in response, the controller may set a cycle rate parameter to 3 cph. In some cases, the controller may provide feedback to the user before, during or after the change is made. For example, the controller may flash a light three times, activate a buzzer three times, and/or provide three pulses of vibration indicating that the cycle rate parameter has been set to 3 cph.

In another illustrative embodiment, a thermostat may include a mechanical selector having a range of positions. The selector may be any type of selector such as a rotating selector, a sliding selector, or any other type of selector, as desired, and the thermostat may have markings that show the relative position of the selector. A mechanical to electrical translator may be provided for translating the mechanical position of the selector to a corresponding electrical signal. The mechanical to electrical translator may be, for example, a potentiometer, an encoder, or any other suitable mechanical to electrical translator, as desired. A controller may receive the electrical signal(s) from the mechanical to electrical translator.

In some embodiments, the selector may have a primary function during normal operation of the thermostat, and a secondary function, although this is not required. The primary function may be to, for example, set the temperature set point of the thermostat. The secondary function may be to set a control parameter such as the cycle rate of the thermostat. A mode control button, switch or the control mechanism may be provided to switch the function of the selector between the primary function and the secondary function, as desired. It is contemplated that more than two functions may be provided, if desired.

During use, and in one illustrative embodiment, a push button may be pushed to switch the function of the selector from a primary function of, for example, setting the temperature set point of the thermostat, to a secondary function of, for example, setting the cycle rate of the thermostat. Once pushed to select the secondary function, the selector may be moved to a position that corresponds to, for example, the desired cycle rate of the thermostat.

In some cases, indicia normally used to set the temperature set point may be used to set the desired cycle rate. For example, indicia may be provided adjacent to the selector such as 50, 55, 60, 65, 70, 75, 80, etc., which may be used to select a desired temperature set point during normal operation of the thermostat. In some illustrative embodiments, these same indicia may be used to select a desired cycle rate. For example, the selected cycle rate may correspond to one-twentieth of the indicia provided adjacent to the selector. For example, if the user moves the selector to point at "60", this may correspond to a cycle rate of 3 cph. In other embodiments, separate indicia may be provided, if desired.

Once the desired cycle rate has been selected, the push button may again be pushed to switch the function of the selector from the secondary function of, for example, selecting a desired cycle rate, to the primary function of setting the temperature set point of the thermostat. In some cases, the controller may provide feedback to the user before, during or after the change to cycle rate is made. Returning to the previous example, the controller may, for example, flash a light three times and/or activate a buzzer three times, indicating that the cycle rate parameter has been set to 3 cph.

In another illustrative embodiment of the present invention, a thermostat may be provided that includes one or more jumpers and two or more jumper pins. Each jumper may have at least two connector ports that are electrically connected together. The jumper pins may, for example, be provided in pairs and held in place by a jumper housing. In this example, each pair of jumper pins may be received by the connector ports of a corresponding jumper. Thus, a jumper, when installed, may form an electrical connection between the pair of jumper pins. A controller may be coupled to the jumper pins, and may set the cycle rate or other desired parameter to a value that is dependent on which jumper pins are electrically connected together by corresponding jumpers.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
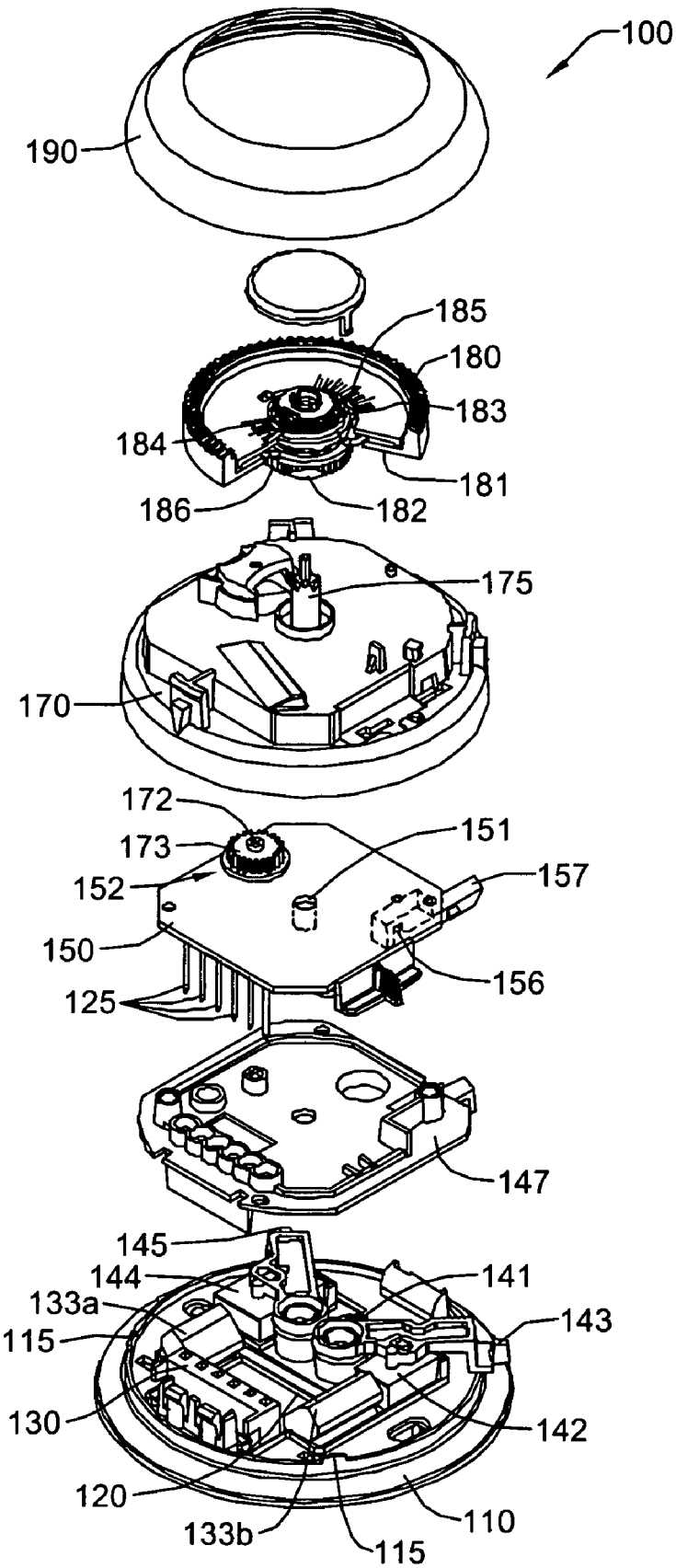
FIG. 1 is a perspective exploded view of an illustrative thermostat.

FIG. 1 is a perspective exploded view of an illustrative thermostat 100 in accordance with the present invention. The illustrative thermostat includes a base plate 110 which is configured to be mounted on a wall using any number of fastening means such as, for example, screws, nails, adhesive, etc. The illustrative base plate 110 has a circular shape however the base plate 110 can have any desired shape, as desired. In an illustrative embodiment, the base plate has a diameter in the range of 8 cm to 12 cm.

The base plate 110 can include a first printed circuit board 120. In the embodiment shown, the printed circuit board 120 is affixed to base plate 110. One or more wires may be used to interconnect a remote HVAC system (e.g., furnace, boiler, air conditioner, humidifier, etc.) to the base plate 110 using terminal blocks 133a and 133b.

In the illustrative embodiment, a variety of switches are disposed on the base plate 110 and in electrical connection with the first printed circuit board 120. A fuel switch 141 is shown located near the center of the base plate 110. The fuel switch 141 can switch between E (electrical) and F (fuel). A FAN ON/AUTOMATIC switch 142 and corresponding lever 143 is shown disposed on the base plate 110. The FAN ON/AUTOMATIC switch 142 can be electrically coupled to the printed circuit board 120. A COOL/OFF/HEAT switch 144 and corresponding lever 145 is shown disposed on the base plate 110. The COOL/OFF/HEAT switch 145 can be electrically coupled to the printed circuit board 120.

The printed circuit board 120 can be electrically coupled to a second printed circuit board 150 by a plurality of pins 125 that are fixed relative to the second printed circuit board 150. The plurality of pins 125 may extend through a PCB shield 147 before sliding into a connector 130 on the first printed circuit board 120.

In the illustrative embodiment shown, a potentiometer 152 is disposed on (the opposite side shown) and electrically coupled to the second printed circuit board 150. While a potentiometer 152 is shown, it is contemplated that any mechanical to electrical translator may be used. In the illustrative embodiment, the potentiometer 152 is positioned at or near a center of the second printed circuit board 150, but this is not required. In the illustrative embodiment, the potentiometer 152 is coupled to a controller (not shown) on the second printed circuit board 150, which provides one or more control signals to a remote HVAC system.

A temperature sensor, or in the illustrative embodiment, a thermistor (not shown) may be disposed on and electrically coupled to the second printed circuit board 150. In one embodiment, the temperature sensor or thermistor can be located near an edge of the second printed circuit board 150, however it is contemplated that the thermistor can be located at any location on or near the second printed circuit board 150, or elsewhere, as desired.

In some embodiments, a light source 156 is disposed on and electrically coupled to the second printed circuit board 150. The light source can be, for example, an LED or any other suitable light source. In the illustrative embodiment, the light source 156 is placed adjacent to a light guide 157. The light guide 157 is shown extending away from the second printed circuit board 150, and may extend through an intermediate housing 170 for viewing by a user of the thermostat, if desired.

The intermediate housing 170 is shown disposed adjacent to the second printed circuit board 150 and base plate 110. In the illustrative embodiment, the intermediate housing 170 includes a support member 175 located at or near a center of the intermediate housing 170 and extending away from the intermediate housing 170. A potentiometer shaft 172 can extend from the potentiometer 152 and through the intermediate housing 170. In one illustrative embodiment, the potentiometer shaft 172 can be offset from the support member 175, while in other embodiments, the potentiometer shaft 172 can extend up through the support member 175, as desired. In the illustrative embodiment shown in FIG. 1, the potentiometer shaft 172 includes a circular gear 173 disposed about the potentiometer shaft 172. It is contemplated that the shaft 172 and gear 173 can be one, two or more pieces, as desired.

A rotatable selector 180 is shown disposed about the support member 175. The illustrative rotatable selector 180 is shown having a circular annular shape. However, this is not required. For example, the rotatable selector 180 may have a circular semi-annular shape, a square shape, a hexagonal shape or any other suitable shape, as desired. Also, it is contemplated that the selector may be a slider that slides along a predetermined path, or any other type of mechanical selector, as desired.

Returning to the illustrative embodiment shown in FIG. 1, the rotatable selector 180 can include a planar portion 181 and a sleeve 182. The sleeve 182 is shown disposed on the planar portion 181 and extends away form the planar portion 181. In the illustrative embodiment, the sleeve 182 is located at or near a center or centroid of the rotatable selector 180, but this is not required.

A circular gear 186 is shown disposed about the sleeve 182. In some embodiments, the circular gear 186 and the rotatable selector 180 may be separate pieces and subsequently secured together, or may be formed as a single piece, as desired. The circular gear 186 can be configured to engage the potentiometer circular gear 173 so that the potentiometer gear 173 moves as the rotatable selector gear 186 moves. The sleeve 182 is disposed about the support member 175 and is adapted to allow for rotational movement of the rotatable selector 180 about the support member 175.

A scale plate 183 can be disposed adjacent the planar portion 181 and fixed in a non-rotating manner to the support member 175. The scale plate 183 can include indicia such as, for example, temperature indicia for both a current temperature and a set point temperature. A current temperature indicator 184 can be fixed to the scale plate 183 and can be formed of a bimetal coil, if desired. A set point temperature indicator 185 can be fixed to the planar portion 181. Thus, in this illustrative embodiment, the rotatable selector 180 and set point temperature indicator 185 rotate relative to the scale plate 183 and current temperature indicator 184.

In some embodiments, a display (e.g. LCD display), one or more buttons, indicator lights, noise making devices, logos, and/or other devices and/or components may be fixed to the support member 175, if desired, wherein the rotatable selector 180 may rotate relative to these other devices and/or components. An outer housing 190 is shown disposed on the intermediate housing 170. In the illustrative embodiment, the outer housing 190 has an annular shape, however the outer cover 190 can have any suitable shape, as desired.

Figure 2:
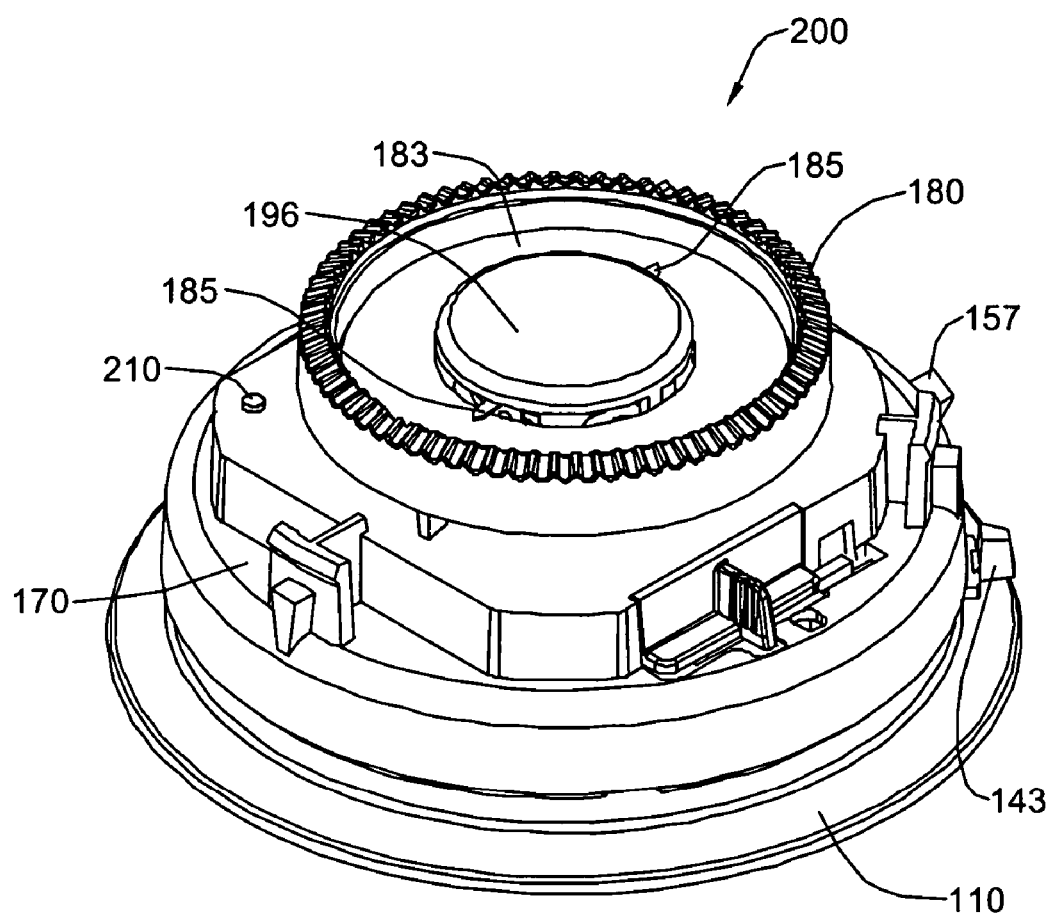
FIG. 2 is a perspective view of an illustrative thermostat showing a parameter adjustment button in accordance with the present invention.

FIG. 2 is a perspective view of a thermostat 200 showing a parameter adjustment push button 210. For illustration purposes, the parameter adjustment button is used to adjust a cycle rate parameter. However, it is contemplated that other thermostat parameters may be adjusted in a similar manner. Some other illustrative parameters may include, for example, room swing, ventilation rate, window heat efficiency used for humidity control, humidity level, and/or any other desired parameter.

In some cases, the parameter adjustment button 210 may be used to select the type of HVAC equipment used. For example, the parameter adjustment button 210 may identify, for example, whether the HVAC equipment is a hydronic system, a high efficiency system with a heat pump, a forced air system, electric heat, etc. In some cases, the value of one or more control parameters may be automatically selected by the controller based on the type of HVAC equipment selected. For example, for hydronic systems, the cph may be automatically set to 1. For high efficiency systems with a heat pump, the cph may be automatically set to 3. For forced air systems, the cph may be automatically set to 6, and for electric heat systems, the cph may be automatically set to 9. These settings may or may not be overridden by the user, as desired.

The parameter adjustment push button 210 is shown protruding from the front of the thermostat, however it is contemplated that parameter adjustment push button 210 can protrude out the back of the thermostat or in any other location, or be accessible though a hole in the outer housing of the thermostat, as desired.

As described above, the cycle time or cycle rate can be defined as the time between successive startups of the furnace or the number of times a furnace ignites in an hour. In one embodiment, the parameter adjustment push button 210 can be revealed by removing the outer housing 190. In other embodiments, the parameter adjustment push button 210 can be placed on the thermostat 200 so that the outer housing 190 need not be removed to engage the parameter adjustment push button 210.

In some embodiments, the thermostat 200 can include a selected temperature set point, a selected cycle rate or room swing setting, and a temperature sensor (not shown). The temperature sensor (not shown) may provide a temperature indication, and the thermostat 200 may provide a control signal to the HVAC equipment that is dependent at least in part on the selected temperature set point, the selected cycle rate or room swing setting, and/or the temperature indication provided by the temperature sensor.

In some embodiments, the parameter adjustment push button 210 may provide a signal each time it is depressed. In some cases, the parameter adjustment push button 210 may include tactile feedback. That is, the parameter adjustment push button 210 may snap or provide a detent action when depressed, indication to the user that the parameter adjustment push button 210 has in fact been depressed sufficiently.

As noted above, the parameter adjustment push button 210 in this illustrative embodiment can be used to adjust the cycle rate of the thermostat. The parameter adjustment push button 210 is coupled to a controller (not explicitly shown), and in this case a controller on the second printed circuit board 150. The controller is adapted to receive a sequence of one or more signals from the parameter adjustment push button 210, and set the cycle rate or room swing setting to a value that corresponds to the sequence of one or more signals. For example, the controller (not shown) can be adapted to set the cycle rate or room swing setting to a value that depends on the number of times the parameter adjustment push button 210 is sequentially depressed, a coded sequence in which the parameter adjustment push button 210 is depressed, the length of time the parameter adjustment push button 210 is depressed, or any other suitable pattern or sequence, as desired. As described above, the cycle rate or room swing setting may correspond to a number of cycles per hour for an HVAC system.

In some illustrative embodiments, the thermostat 200 can also include an indicator 157 that provides a visual, aural, and/or tactile message that indicates the selected cycle rate or room swing setting. For example, the indicator 157 can be a visual indicator such as, for example, an LED or any other suitable light source. In the illustrative embodiment, an LED is disposed on the second printed circuit board 150, and a light pipe 157 may deliver the light to a location outside of the intermediate housing 170 as shown. In other embodiments, the indicator can be a buzzer, beeper or any other suitable audible source. In yet other embodiments, the indicator can be a vibrator or any other suitable tactile source.

In some cases, the indicator 157 can provide an indication to the user of the cycle rate entered by providing a number of visual "light flashes", aural "beeps" and/or vibration "pulses". In some cases, the number of visual "light flashes", aural "beeps" and/or vibration "pulses" may directly correspond to the number of times the parameter adjustment push button 210 was depressed by the user. For example, if the parameter adjustment push button 210 was depressed three times, the indicator 157 may "flash" three times to visually indicate to the user that the cycle rate was set to a value of 3 cph. In some embodiments, the indicator 157 may "flash" following each time the parameter adjustment push button 210 is depressed. In some cases, the parameter adjustment push button 210 may include tactile feedback. That is, the parameter adjustment push button 210 may snap or provide a detent action when depressed, indication to the user that the parameter adjustment push button 210 has in fact been depressed sufficiently. In yet another illustrative embodiments, the indicator 157 may "flash" following each time the parameter adjustment push button 210 is depressed by the user, and then later "flash" or blink" the number of times that corresponds to the newly selected cycle rate.

In some embodiments, the input parameter may be set to a desired value using a coded sequence. For example, a number of parameter values may each be assigned to a corresponding coded sequence of longer and shorter depressions of push button 210. For example, a cycle rate of 1 cph may correspond to a short duration depression followed by two more short duration depressions of the parameter adjustment push button 210. A cycle rate of 2 cph may correspond to two short duration depression followed by a long duration depression. A cycle rate of 3 cph may correspond to a short-long-short sequence of depressions, and so on. This is only one illustrative example of a coded sequence that may be used. Other coded sequences may also be used, if desired.

Figure 3:
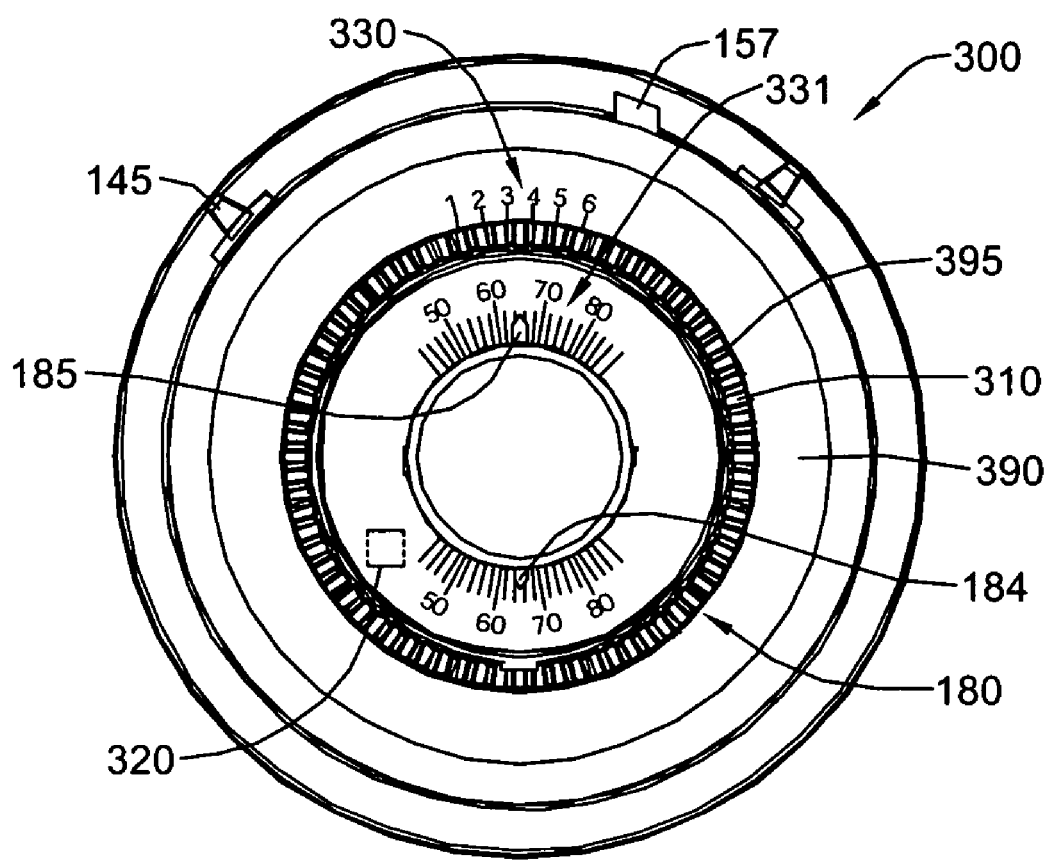
FIG. 3 is a perspective view of another illustrative thermostat showing a cycle rate selector in accordance with the present invention.

FIG. 3 is a perspective view of another thermostat 300 that includes a mechanical selector 310, wherein the selector 310 has a range of positions. The selector 310 may be any type of selector such as a rotating selector, a sliding selector, or any other type of selector, as desired. The illustrative thermostat 300 includes markings 330 that show the relative position of the selector 310. The markings 330 can be configured to be seen with or without removing the outer housing 190, as desired. A mechanical to electrical translator (not shown) may be provided for translating the mechanical position of the selector 310 to a corresponding electrical signal. The mechanical to electrical translator may be, for example, a potentiometer, an encoder, a magnetic or optical sensor, or any other suitable translator device or component. A controller (not explicitly shown) may receive the electrical signal from the mechanical to electrical translator.

In some embodiments, the selector 310 may have a primary function during normal operation of thermostat 300, and a secondary function. The primary function may be, for example, to set the temperature set point of the thermostat 300. A primary set of markings 331 and a set point temperature indicator 185 may be provided to show the selected temperature set point. The secondary function may be to set another control parameter, such as the cycle rate of the thermostat 300.

In some illustrative embodiments, a mode control button, switch or other control mechanism 320 may be provided to switch the function of the selector 310 between the primary function and the secondary function, as desired. It is contemplated that more than two functions may be provided, if desired. That is, it is contemplated that, for example, the secondary function may be to select the cycle rate of the thermostat 300, and a third function may be to select a value for some other control parameter, as desired. In some embodiments, the mode control button, switch or other control mechanism 320 may be used to select the desired mode or function of the selector 310.

During use, and the illustrative embodiment shown in FIG. 3, the mode control button, switch or other control mechanism 320 may be pushed to switch the function of the selector 310 from a primary function of setting the temperature set point of the thermostat 300 using primary markings 331, to a secondary function of setting the cycle rate of the thermostat 300. Once pushed, the selector 310 may be moved to a position that corresponds to the desired cycle rate of the thermostat, as indicated by secondary markings 330.

In some cases, only one set of indicia may be provided. The indicia may correspond to those normally used to set the temperature set point of the thermostat. For example, the indicia may include markings 331, and may include markings for 50, 60, 70, 80, etc., which may be used to select a desired temperature set point. The selected cycle rate may correspond to, for example, one-twentieth of the indicia 331. For example, if the user moves the selector 310 to point to "60" of indicia 331, this may correspond to a cycle rate of 3 cph. It is contemplated that any other correspondence between the temperature set point markings 331 and cph or any other parameter can be used, including, but not limited to, 61 degrees=1 cph, 62 degrees=2 cph, etc. As indicated above, separate indicia may also be provided, as desired.

Once the desired cycle rate has been selected using the selector 310, the mode control button, switch or other control mechanism 320 may again be pushed to switch the function of the selector 310 from the secondary (or third, fourth, etc.) function to the primary function of setting the temperature set point of the thermostat 300. It is contemplated that a timeout function could also be used to switch back to the primary function, rather than pushing the control button, switch, or other control mechanism 320 again, if desired.

In some cases, the controller may provide feedback to the user before, during and/or after the change to the cycle rate or other parameter is made. Returning to the previous example, the controller may, for example, flash or beep indicator 157 three times, indicating that the cycle rate parameter has been set to 3 cph.

Rather than providing a separate mode control button, switch or other control mechanism 320, it is contemplated that an existing switch may be used. For example, and in some embodiments, the switch 145 may be used. The switch 145 can have a first position and a second position. If the switch 145 is in the first position, the cycle rate or room swing setting can be set using the selector 310. If the switch is in the second position, the set point temperature can be selected. In some embodiments, the indicator 157 may "flash" or "beep" a number of times corresponding to the newly set cycle rate once the switch 145 is moved between the first and second position.

Figure 4:
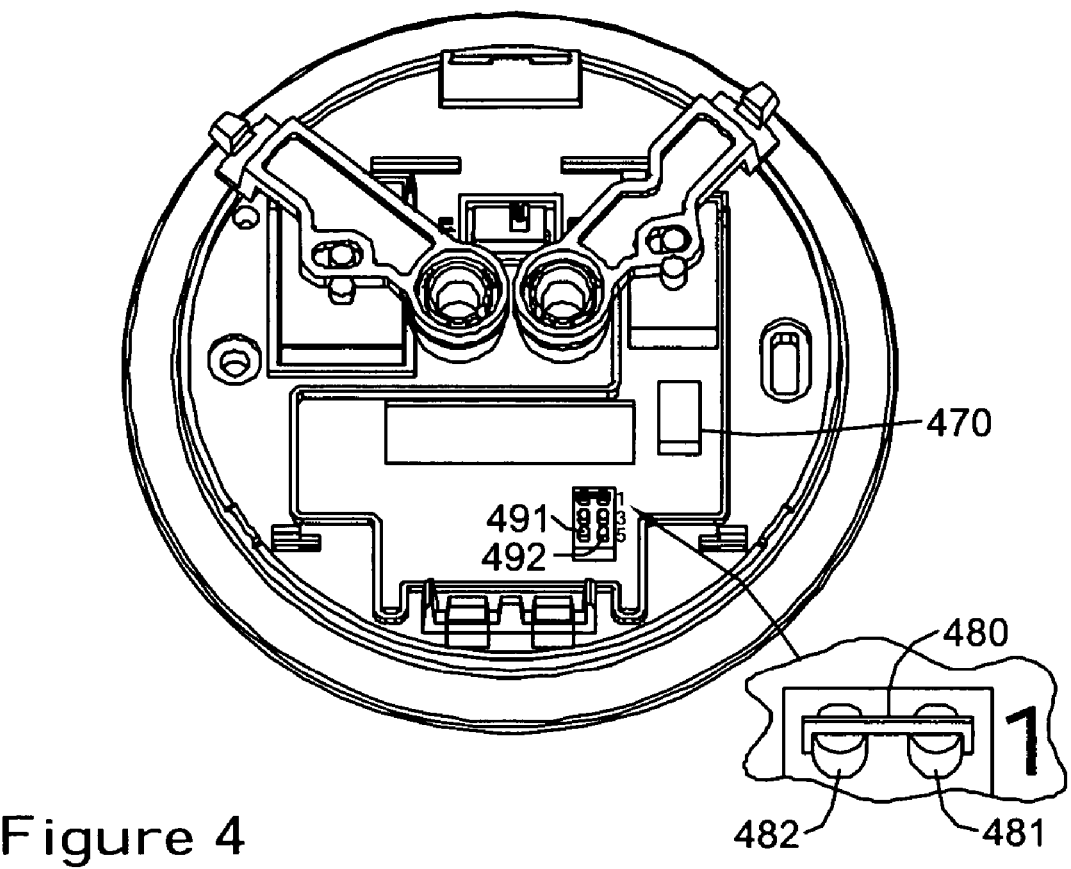
FIG. 4 is a perspective view of another illustrative thermostat that includes a plurality of cycle rate jumpers in accordance with the present invention.

FIG. 4 is a perspective view of a thermostat 400 that includes a plurality of cycle rate jumpers 480. In this illustrative embodiment, thermostat 400 includes one or more jumpers 480 and two or more jumper pins 481 and 482.

Each jumper 480 may have at least two connector ports that are electrically connected together. The jumper pins 481 and 482 may, for example, be provided in pairs as shown and held in place by a jumper housing. In this example, each pair of jumper pins 481 and 482 may be received by the connector ports of a corresponding jumper 480. Thus, a jumper 480, when installed, may form an electrical connection between the pair of jumper pins 481 and 482. A controller may be coupled to the jumper pins, and may set the cycle rate or other desired parameter to a value that is dependent on which jumper pins are electrically connected together by jumpers 480. In the illustrative embodiment shown, only the top pair of jumper pins 481 and 482 are connected by a jumper 480. The remaining jumper pins, such as jumper pins 491 and 492, are not connected by a jumper, and thus remain isolated from one another. One or more other jumper housings may also be provided, such as jumper housing 470.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A thermostat for controlling an HVAC system, the thermostat having one or more control parameters, the thermostat comprising:
    a push button for providing a signal each time it is depressed; and
    a controller coupled to the push button, wherein the controller is adapted to receive a sequence of one or more signals from the push button, and is further adapted to set a control parameter to a value that corresponds to the sequence of the one or more signals;
    wherein the control parameter is a maximum cycle rate parameter for the HVAC system.

2. A thermostat according to claim 1 wherein the one or more control parameters include a room temperature swing parameter.

3. A thermostat according to claim 1 wherein the one or more control parameters include a temperature set point.

4. A thermostat according to claim 1 wherein the one or more control parameters include an equipment type parameter.

5. A thermostat according to claim 1 wherein the controller is adapted to receive a number of signals from the push button, and is further adapted to set the control parameter to a value that corresponds to the number of signals received from the push button.

6. A thermostat according to claim 1 wherein the controller is adapted to receive a coded sequence of signals from the push button, and is further adapted to set the control parameter to a value that corresponds to the coded sequence of signals received from the push button.

7. A thermostat according to claim 1 wherein the thermostat does not include an LCD display.

8. A thermostat according to claim 1, further comprising an indicator that provides a visual, aural and/or tactile indication that indicates that the one or more control parameter has been set.

9. A thermostat according to claim 8, wherein the indicator includes a flashing light.

10. A thermostat according to claim 8, wherein the indicator includes a flashing light, and wherein the flashing light flashes in a sequence that corresponds to the sequence of one or more signals received from the push button.

11. A thermostat according to claim 8, wherein the thermostat includes a housing, a light source and a light pipe, and wherein the light source is located within the housing and the light pipe delivers at least some of the light to a location that is outside of the housing, the indicator includes flashing the light source.

12. A thermostat according to claim 1, further comprising a switch coupled to the controller, wherein the switch must be in a first position before the controller will set the control parameter to the value that corresponds to the sequence of one or more signals.

13. A method for setting a control parameter of a thermostat, the method comprising the steps of:
    pushing a push button in a sequence that corresponds to a value for the control parameter;
    setting the control parameter to a value that corresponds to the sequence; and
    providing a visual indication of the value of the control parameter that has been set, the indication including a flashing light.

14. A method according to claim 13 wherein the control parameter is a cycle rate parameter.

15. A method according to claim 13 wherein the control parameter is a room temperature swing parameter.

16. A method according to claim 13 wherein the control parameters is a set point.

17. A method according to claim 13 wherein the one or more control parameters include an equipment type parameter.

18. A method according to claim 13 wherein the pushing step sequentially pushes the push button a number of times, and the setting step sets the value of the control parameter to a value that corresponds to the number of times that push button is pushed.

19. A method according to claim 13 wherein the pushing step pushes the push button in a coded sequence, and the setting step sets the control parameter to a value that corresponds to the coded sequence.

20. A method according to claim 13, wherein the flashing light flashes in a sequence that corresponds to the sequence that the push button was pushed.

21. A method according to claim 13, further comprising the step of:
    selecting a position of a switch having two or more positions, wherein the switch must be in a first position before the control parameter will be set to the value that corresponds to the sequence that the push button was pushed.

22. A method according to claim 21, further comprising blinking a light, providing a beep and/or providing tactile feedback each time the push button is pressed when the switch is in the first position.

23. A method according to claim 22, further comprising blinking the light, providing a beep, and/or providing tactile feedback a number of times that depends on the value set for the control parameter when the switch is switched to a second position.

24. A thermostat having a number of control parameters including a temperature set point, the thermostat comprising:
    a mechanical user interface having a range of positions;

a mechanical to electrical translator for translating the current position of the mechanical user interface into a corresponding electrical signal;

a controller for setting the temperature set point based on the corresponding electrical signal received from the mechanical to electrical translator;

a push button for providing a signal each time it is depressed; and the controller is coupled to the push button, wherein the controller is adapted to receive a sequence of one or more signals from the push button, and is further adapted to set a control parameter other than the temperature set point to a value that corresponds to the sequence of one or more signals.

25. A thermostat according to claim 24 wherein the control parameter is a cycle rate parameter.

26. A thermostat according to claim 24 wherein the control parameter is a room temperature swing parameter.

27. A thermostat according to claim 24 wherein the control parameters is a set point.

28. A thermostat according to claim 24 wherein the one or more control parameters include an equipment type parameter.

29. A thermostat according to claim 24 wherein the controller is adapted to receive a number of signals from the push button, and is further adapted to set the control parameter to a value that corresponds to the number of signals received from the push button.

30. A thermostat according to claim 24 wherein the controller is adapted to receive a coded sequence of signals from the push button, and is further adapted to set the control parameter to a value that corresponds to the coded sequence of signals received from the push button.

31. A thermostat according to claim 24, further comprising an indicator that provides feedback to a user related to the value that the control parameter has been set.

32. A thermostat according to claim 31, wherein the indicator includes a visual, audible and/or tactile indicator.

33. A thermostat having one or more control parameters, the thermostat comprising:

a push button for providing a signal each time it is depressed; and a controller coupled to the push button, wherein the controller is adapted to receive a sequence of one or more signals from the push button, and is further adapted to set a control parameter to a value that corresponds to the sequence of the one or more signals;

wherein the one or more control parameters include a room temperature swing parameter.

34. A thermostat having one or more control parameters, the thermostat comprising:

a push button for providing a signal each time it is depressed; and a controller coupled to the push button, wherein the controller is adapted to receive a sequence of one or more signals from the push button, and is further adapted to set a control parameter to a value that corresponds to the sequence of the one or more signals; and an indicator including a flashing light, the indicator providing a visual indication that indicates that the one or more control parameter has been set.

35. A thermostat according to claim 34, wherein the flashing light flashes in a sequence that corresponds to the sequence of one or more signals received from the push button.

36. A thermostat according to claim 34, wherein the thermostat includes a housing, a light source and a light pipe, and wherein the light source is located within the housing and the light pipe delivers at least some of the light to a location that is outside of the housing, the light source providing the flashing light.

37. A thermostat having one or more control parameters, the thermostat comprising:

a push button for providing a signal each time it is depressed; and a controller coupled to the push button, wherein the controller is adapted to receive a sequence of one or more signals from the push button, and is further adapted to set a control parameter to a value that corresponds to the sequence of the one or more signals; and a switch coupled to the controller, wherein the switch must be in a first position before the controller will set the control parameter to the value that corresponds to the sequence of the one or more signals.

38. A thermostat according to claim 37, wherein the controller is adapted to blink a light or beep each time the push button is depressed when the switch is in the first position.

39. A thermostat according to claim 37, wherein the controller is adapted to blink the light or beep a number of times that depends on the value set for the control parameter when the switch is switched to a second position.

40. A thermostat according to claim 37, wherein the push button is used to set two or more control parameters.

41. A thermostat according to claim 40, wherein the switch has two or more positions, wherein the position of the switch dictates, at least in part, which control parameter is to be set by the push button.

42. A thermostat having one or more control parameters, the thermostat comprising:

a push button for providing a signal each time it is depressed; and a controller coupled to the push button, wherein the controller is adapted to receive a sequence of one or more signals from the push button, and is further adapted to set a control parameter to a value that corresponds to the sequence of the one or more signals;

wherein the push button is used to set two or more control parameters.

* * * * *